United States Patent
Hwang et al.

(10) Patent No.: US 6,791,964 B1
(45) Date of Patent: Sep. 14, 2004

(54) MULTICARRIER CDMA RAKE RECEIVER APPARATUS

(75) Inventors: Jong-Yoon Hwang, Seoul (KR); Sang-Min Bae, Suwon-shi (KR); Jin-Woo Heo, Songnam-shi (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/475,560

(22) Filed: Dec. 30, 1999

(30) Foreign Application Priority Data

Dec. 31, 1998 (KR) .............................. 10-1998-0062707

(51) Int. Cl.[7] .............................................. H04B 7/216
(52) U.S. Cl. ........................ 370/342; 370/335; 375/206
(58) Field of Search ................................ 370/342, 335, 370/441, 320, 479, 202, 208, 209, 515, 514, 519, 465, 503, 507, 203; 375/200, 202, 1, 267, 208, 210, 206, 349, 347; 455/67.11, 139, 550, 454, 575.1, 65, 276.1, 272.1; 341/173, 139, 135, 187; 342/132, 135, 145, 189, 127, 203, 131, 159

(56) References Cited

U.S. PATENT DOCUMENTS

| | | | | |
|---|---|---|---|---|
| 5,144,641 A | * | 9/1992 | Akazawa et al. ............... 375/1 |
| 5,278,864 A | * | 1/1994 | Mori et al. ..................... 375/1 |
| 5,490,165 A | * | 2/1996 | Blakeney, II et al. ........ 375/202 |
| 5,497,160 A | * | 3/1996 | Koehler et al. ............. 342/145 |
| 5,737,329 A | * | 4/1998 | Horiguchi .................... 370/342 |
| 5,764,687 A | * | 6/1998 | Easton ........................ 375/206 |
| 5,835,488 A | * | 11/1998 | Sugita ......................... 370/335 |
| 5,978,412 A | * | 11/1999 | Takai .......................... 375/200 |
| 6,058,137 A | * | 5/2000 | Partyka ....................... 375/301 |

* cited by examiner

Primary Examiner—Edward F. Urban
Assistant Examiner—C. Chow
(74) Attorney, Agent, or Firm—Dilworth & Barrese LLP (57) ABSTRACT

A receiving device in a multi-carrier CDMA communication system. In the receiving device, a time compensation means has a time tracker for each of signals received on multi-carriers and generates a time delay compensation signal by combining time errors of the carriers received from the time trackers. A first PN sequence generator generates a first PN sequence whose time delay is compensated for by the time delay compensation signal. A plurality of PN despreaders PN-despread the signals received on the multi-carriers by the first PN sequence. A frequency compensation means detects pilot signals corresponding to the PN-despread signals, generates frequency error signals for the carriers by the detected pilot signals, and compensates for frequency errors of the signals received on the multi-carriers. A phase compensation means compensates for phases for the carriers using the PN-despread signals and the pilot signals. A multiplexer multiplexes the phase-compensated signals.

21 Claims, 5 Drawing Sheets

MULTICARRIER CDMA RAKE RECEIVER APPARATUS

BACKGROUND OF THE INVENTION

1. Field of the Invention

The present invention relates generally to a receiving device in a CDMA (Code Division Multiple Access) communication system, and in particular, to a receiving device in a multi-carrier CDMA communication system.

2. Description of the Related Art

A single carrier is used in CDMA based on the IS-95 standards. A general CDMA rake receiver employs direct spreading and uses one carrier for each transmission path. The future CDMA communication system, however, can transmit user data simultaneously in a plurality of frequency bands in a multi-carrier scheme.

Figure 1:
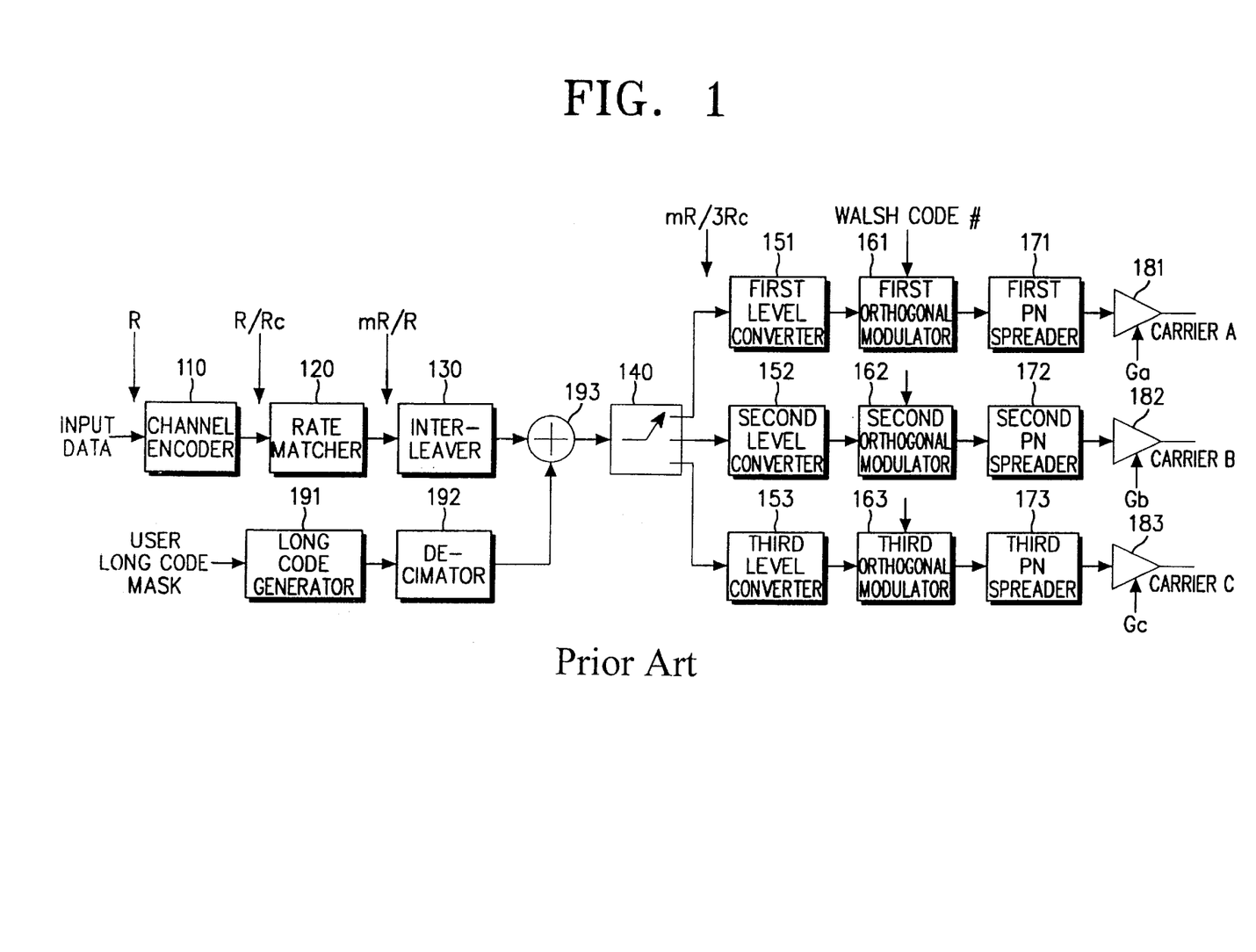
FIG. 1 is a block diagram of a transmitting device in a multi-carrier CDMA communication system.

FIG. 1 is a block diagram of a multi-carrier transmitting device.

Referring to FIG. 1, a channel encoder 110 encodes input data in frame units and generates encoded symbol data. If the symbol data is not at a full rate a rate matcher 120 repeats the symbol data received from the channel encoder 100 to achieve a full rate data. An interleaver 130 interleaves the output of the rate matcher 120. Here, the interleaver 130 may be a block interleaver.

A long code generator 191 generates a long code for scrambling a received signal. The long code is different for each user to identify the individual user. A decimator 192 decimates the long code to match the symbol rate at the output of the interleaver 130. An adder 193 adds the outputs of the interleaver 130 and the decimator 192. The adder 193 can be an XOR gate.

A demultiplexer 140 sequentially demultiplexes the data received from the adder 193 with different carriers. First to third level converters 151 to 153 convert the binary data received from the demultiplexer 140 to 4-level data. The level converters 151 to 153 convert 2-level data to 4-level data. Therefore, they convert 0s and 1s of the input data to 1s and −1s, respectively. First to third orthogonal modulators 161 to 163 orthogonally modulate data received from the corresponding first to third level converters 151 to 153 with their respective assigned orthogonal codes. The orthogonal codes can be Walsh codes. First to third PN spreaders 171 to 173, which can be complex spreaders, modulate the outputs of the first to third orthogonal modulators 161 to 163. First to third gain controllers 181 to 183 control the gains of the spread signals received from the first to third PN spreaders 181 to 183 by means of input gain control signals Ga to Gc. The signals output from the first to third gain controllers 181 to 183 are modulated with different carrier signals, prior to multi-carrier transmission.

As described above, the forward link structure shown in FIG. 1 generates three encoded symbols for one input bit in the ⅓ rate channel encoder 110 and transmits the encoded symbol data in three carriers through the rate matcher 120 and the interleaver 130. That is, the CDMA forward link structure of FIG. 1 subjects input data to encoding, interleaving, and demultiplexing and then separately transmits the resulting data in three carriers.

To accurately receive signals in different frequency bands from the transmitting device, a receiving device should demodulate the input signals in synchronization with the carrier for each transmission path.

SUMMARY OF THE INVENTION

It is, therefore, an object of the present invention to provide a receiving device for synchronizing with an input multi-carrier signal in time, frequency, and phase in a multi-carrier CDMA communication system.

It is another object of the present invention to provide a receiving device which can compensate for time delay and phase errors of an input multi-carrier signal separately for individual carriers in a multi-carrier CDMA communication system.

It is a further object of the present invention to provide a receiving device which can compensate for time delay of an input multi-carrier signal commonly for all carriers and can compensate for phase errors individually for the carriers in a multi-carrier CDMA communication system.

It is still another object of the present invention to provide a receiving device which can compensate for time delay of an input multi-carrier signal individually for the carriers and compensate for phase errors commonly for the carriers in a multi-carrier CDMA communication system.

These and other objects are achieved by providing a receiving device in a multi-carrier CDMA communication system. In the receiving device, a time compensation means has a time tracker for each of the signals received on multi-carriers and generates a time delay compensation signal by combining time errors of the carriers received from the time trackers. A first PN sequence generator generates a first PN sequence whose time delay is compensated for by the time delay compensation signal. A plurality of PN despreaders PN-despread the signals received on the multi-carriers by the first PN sequence. A frequency compensation means detects pilot signals corresponding to the PN-despread signals, generates frequency error signals for the carriers by the detected pilot signals, and compensates for frequency errors of the signals received on the multi-carriers. A phase compensation means compensates for phases errors of the carriers using the PN-despread signals and the pilot signals. A multiplexer multiplexes the phase-compensated signals.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described hereinbelow with reference to the accompanying drawings. It is to be noted that like reference numerals denote the same components in the drawings.

In the following description, well-known functions or constructions are not described in detail since they would obscure the invention in unnecessary detail.

Figure 2:
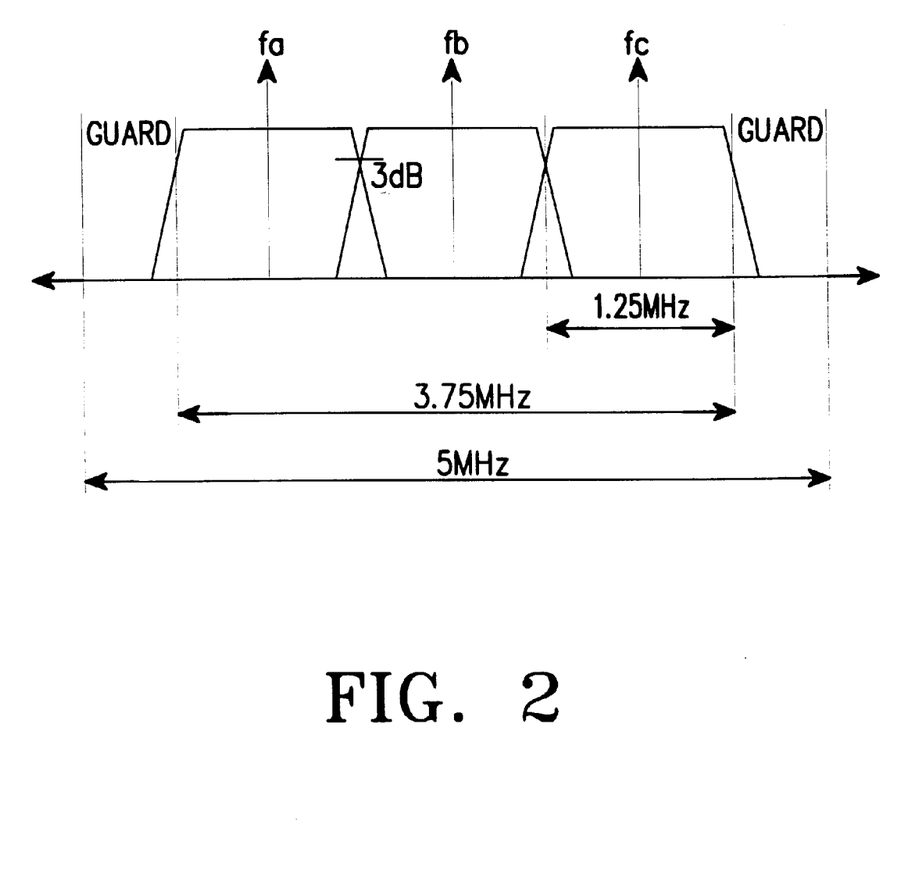
FIG. 2 illustrates frequency characteristics of the multi-carrier CDMA communication system.

FIG. 2 illustrates frequency characteristics of a signal transmitted in a multi-carrier CDMA communication system. In FIG. 2, carriers fa, fb, and fc each have a bandwidth of 1.2288 MHz (hereinafter, 1.25 MHz), the same as the bandwidth of three channels in IS-95. Hence, the three carriers have a total of about 5 MHz, the same as the size of the three IS-95 channels.

For accurate synchronization of the multi-carrier input signal, it is ideal to perform a synchronization in time, frequency, and phase for each carrier. However, it is preferable to reduce the size and complexity of a mobile station system by extending shared circuits without a great decrease in system performance if it is to be configured in VLSI circuits. The present invention embodies a rake receiver for future mobile communications based on a multi-carrier transmission scheme in consideration of system performance and complexity.

Figure 3:
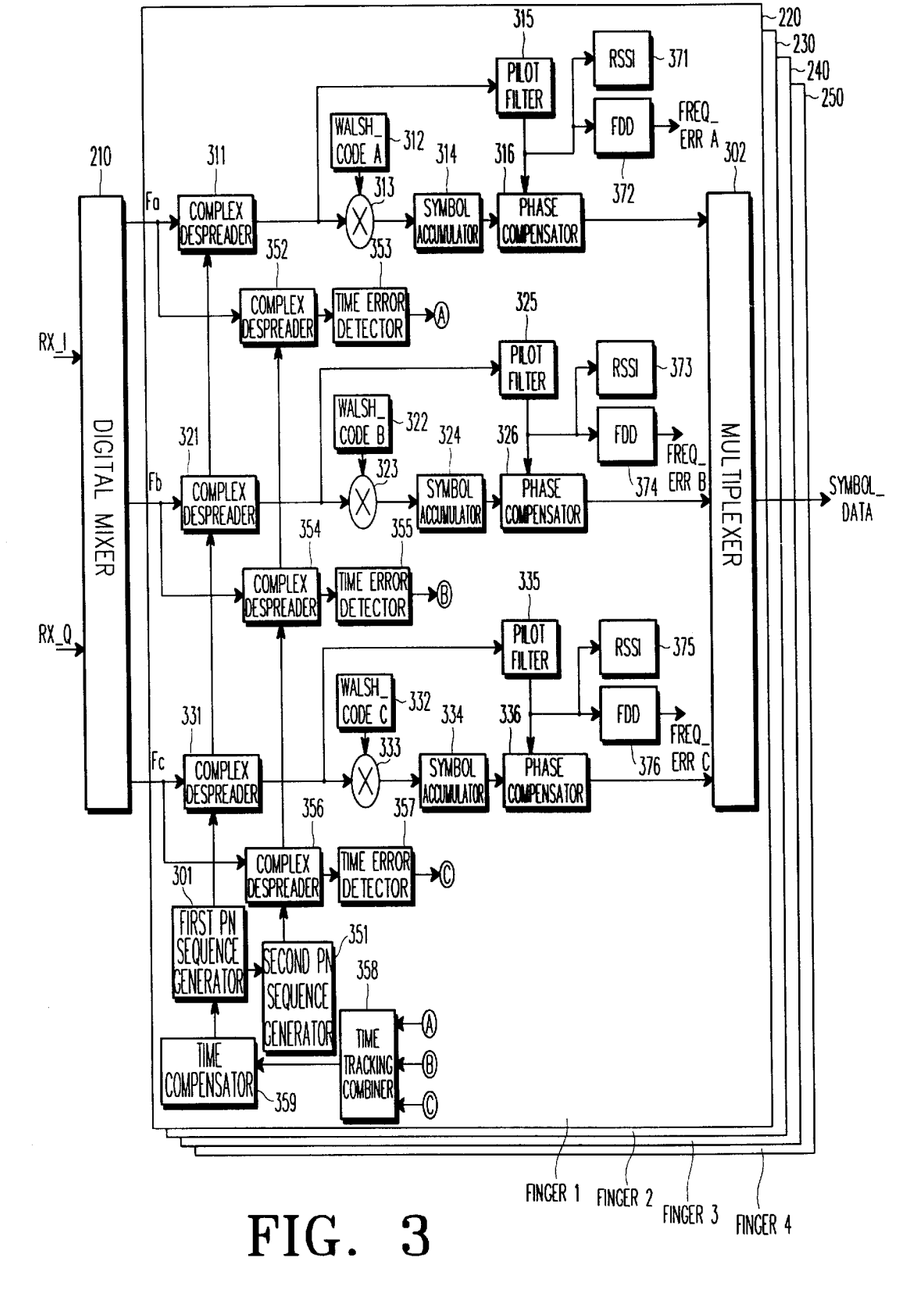
FIG. 3 is a block diagram of a receiver in a multi-carrier CDMA communication system according to an embodiment of the present invention.
Figure 4:
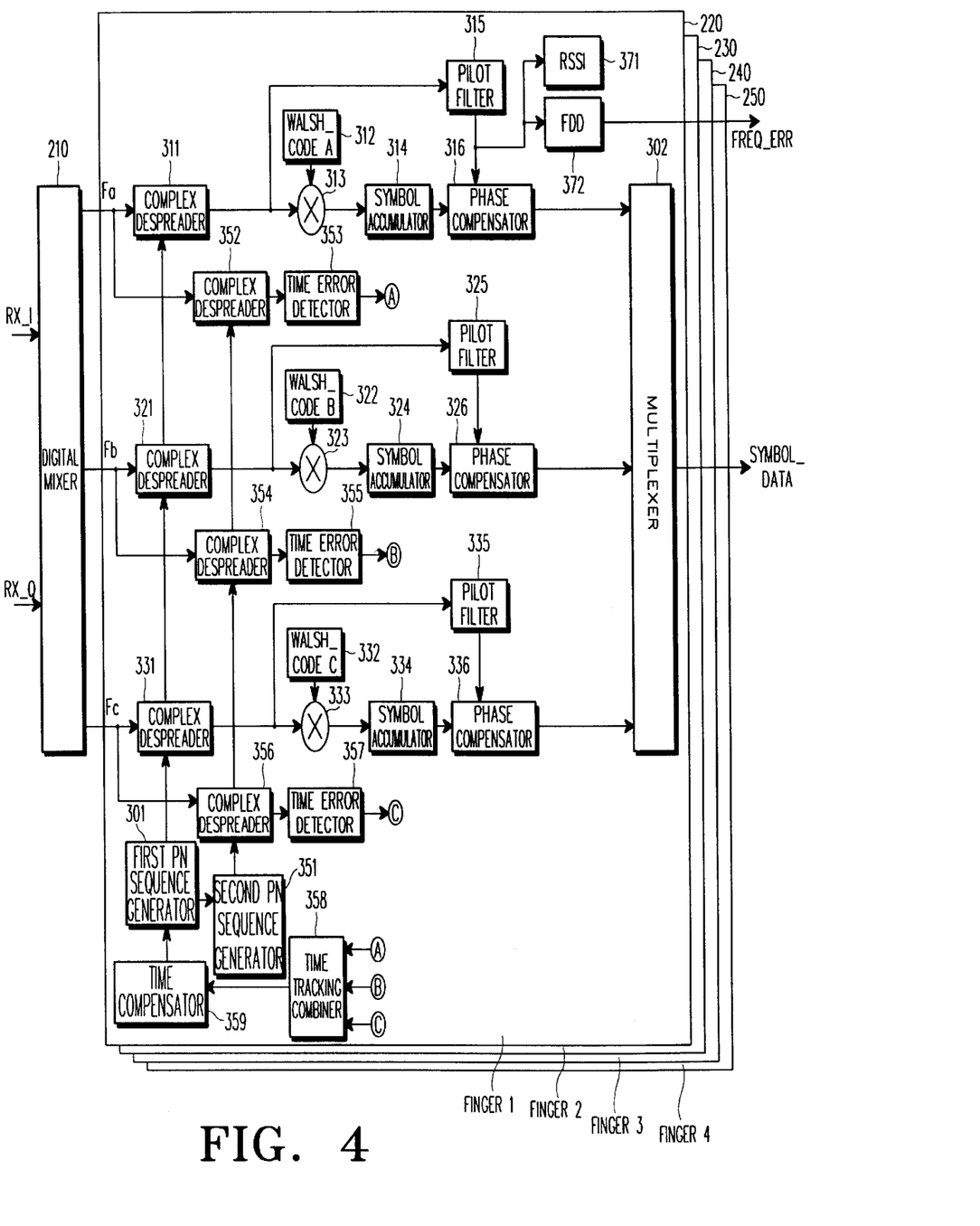
FIG. 4 is a block diagram of a receiver in the multi-carrier CDMA communication system according to another embodiment of the present invention.
Figure 5:
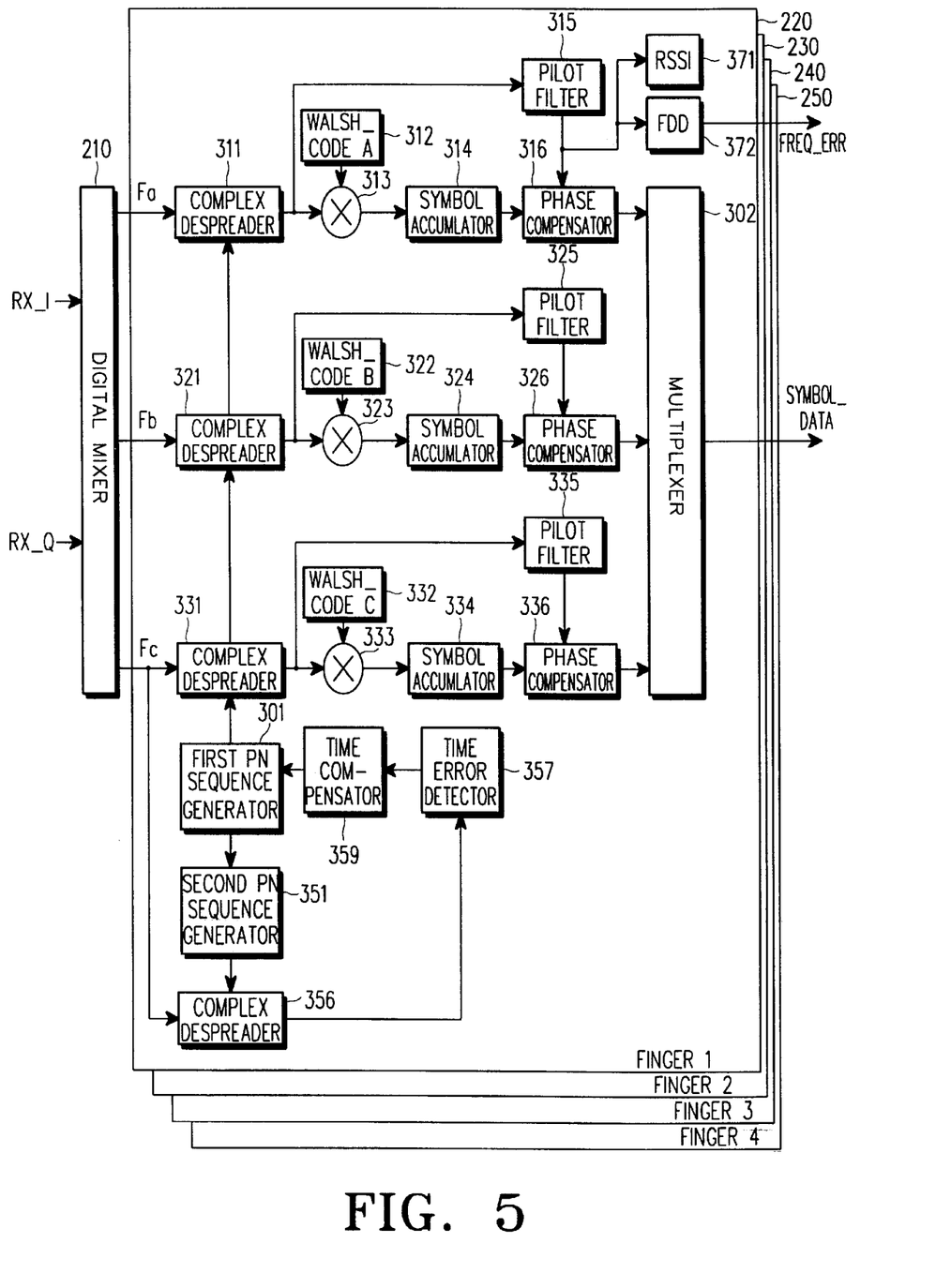
FIG. 5 is a block diagram of a receiver in the multi-carrier CDMA communication system according to a third embodiment of the present invention.

To do so, a multi-carrier CDMA rake receiver is described according to embodiments of the present invention. It is assumed in the present invention that for signals received from the same propagation path, carriers in different frequency bands have the same or similar frequency error. FIG. 3 illustrates a CDMA rake receiver according to a first embodiment of the present invention wherein time delay, frequency errors and phase errors are compensated for separately for each carrier. FIG. 4 illustrates a CDMA rake receiver according to a second embodiment of the present invention wherein time delay and phase errors compensated for separately for each carrier and frequency errors are compensated for commonly for all carriers. FIG. 5 illustrates a CDMA rake receiver according to a third embodiment of the present invention wherein time delay and frequency errors are compensated for commonly for all carriers and phase errors are compensated for separately for each carrier.

Referring to FIG. 3, a digital mixer 210 in the CDMA rake receiver according to the first embodiment of the present invention classifies input signals in wide bands according to their carriers. Fingers 220 to 250 demodulate the carriers received from the digital mixer 210. The number of the fingers 220 to 250 is four and the number of the carriers is three in the embodiment of the present invention. Thus, each finger 220 to 250 should be so configured as to demodulate the three carriers and implement PN despreading and orthogonal demodulation.

A first PN sequence generator 301 generates a PN sequence to be used for PN despreading of the multi-carrier signals received at the fingers.

A complex despreader 311 multiplies the PN sequence received from the first PN sequence generator 301 by a signal transmitted on a first carrier Fa, for despreading. An orthogonal code generator 312 generates a first orthogonal code to identify the signal transmitted on the second carrier Fb. A multiplier 313 demodulates the orthogonal modulation channel signal transmitted on the first carrier Fa. A symbol accumulator 314 accumulates the signal transmitted on the first carrier Fa by the symbol size. Iwal1 and Qwal1 output from the symbol accumulator 314 indicate accumulated values of I- and Q-channel orthogonal modulation symbols transmitted on the first carrier Fa. A pilot filter 315 filters the output of the complex despreader 311 and generates I- and Q-channel signals Ion1 and Qon1 before orthogonal modulation. A phase compensator 316 compensates the phase of the channel signal transmitted on the first carrier Fa by operating the outputs of the symbol accumulator 314 and the pilot filter 315. The phase compensator 316 compensates the phase of the channel signal on the first carrier Fa by Iwal1×Ion1+Qwal1×Qon1.

A complex despreader 321 multiplies the PN sequence received from the first PN sequence generator 301 by a signal transmitted on a second carrier Fb, for despreading. An orthogonal code generator 322 generates a second orthogonal code to identify the signal transmitted on the first carrier Fa. A multiplier 323 demodulates the orthogonal modulation channel signal transmitted on the second carrier Fb. A symbol accumulator 324 accumulates the signal transmitted on the second carrier Fb by the symbol size. Iwal2 and Qwal2 output from the symbol accumulator 324 indicate accumulated values of I- and Q-channel orthogonal modulation symbols transmitted on the second carrier Fb. A pilot filter 325 filters the output of the complex despreader 321 and generates I- and Q-channel signals Ion2 and Qon2 before orthogonal modulation. A phase compensator 326 compensates the phase of the channel signal transmitted on the second carrier Fb by operating the outputs of the symbol accumulator 324 and the pilot filter 325. The phase compensator 326 compensates the phase of the channel signal on the second carrier Fb by Iwal2×Ion2+Qwal2×Qon2.

A complex despreader 331 multiplies the PN sequence received from the first PN sequence generator 301 by a signal transmitted on a third carrier Fc, for despreading. An orthogonal code generator 332 generates a third orthogonal code to identify the signal transmitted on the third carrier Fc. A multiplier 333 demodulates the orthogonal modulation channel signal transmitted on the third carrier Fc. A symbol accumulator 334 accumulates the signal transmitted on the third carrier Fc by the symbol size. Iwal3 and Qwal3 output from the symbol accumulator 334 indicate accumulated values of I- and Q-channel orthogonal modulation symbols transmitted on the third carrier Fc A pilot filter 335 filters the output of the complex despreader 331 and generates I- and Q-channel signals Ion3 and Qon3 before orthogonal modulation. A phase compensator 336 compensates the phase of the channel signal transmitted on the third carrier Fc by operating the outputs of the symbol accumulator 334 and the pilot filter 335. The phase compensator 336 compensates the phase of the channel signal on the third carrier Fb by Iwal3×Ion3+Qwal3×Qon3.

A multiplexer 302 multiplexes the phase-compensated channel signals received from the phase compensators 316 to 336 and feeds the multiplexed signals to a combiner (not shown) at the output ends thereof.

Then, a structure of compensating for time delay of a multi-carrier signal will be described.

A second PN sequence generator 351 generates second PN sequence earlier and then later than the first PN sequence generated from the first PN sequence generator 301. That is, the second PN sequence generator 351 generates a PN sequence (I_E_Time PN sequence and Q_E_Time PN sequence: EARLY PN sequence) earlier than the first PN sequence and then a PN sequence (I_L_Time PN sequence and Q_L_Time PN sequence: LATE PN sequence) later than the first PN sequence. Here, "E" represent for early and "L" for late.

Therefore, the second PN sequence generated from the second PN sequence generator 351 includes the EARLY PN sequence and the LATE PN sequence.

A complex despreader 352 multiplies the time-adjusted second PN sequence received from the second PN sequence generator 351 by the signal transmitted on the first carrier Fa, for despreading. The complex despreader 352 generates a despread EARLY signal of the signal transmitted on the first carrier Fa by use of the early PN sequence received from the second PN sequence generator 351 and a despread LATE signal of the signal transmitted on the first carrier Fa by use of the LATE PN sequence. A time error detector 353 detects a time error rate from the despread EARLY and LATE signals of the signal transmitted on the first carrier Fa received from the complex despreader 352. Here, the time error detector 353 calculates (EARLY$^2$–LATE$^2$) of the signal transmitted on the first carrier Fa and generates a time error signal of the signal transmitted on the first carrier Fa.

A complex despreader 354 multiplies the time-adjusted second PN sequence received from the second PN sequence generator 351 by the signal transmitted on the second carrier Fb, for despreading. The complex despreader 354 generates a despread EARLY signal of the signal transmitted on the second carrier Fb by use of the early PN-sequence received from the second PN sequence generator 351 and a despread LATE signal of the signal transmitted on the second carrier Fb by use of the LATE PN sequence. A time error detector 355 detects a time error rate from the despread EARLY and LATE signals of the signal transmitted on the second carrier Fb received from the complex despreader 354. Here, the time error detector 355 calculates (EARLY$^2$–LATE$^2$) of the signal transmitted on the second carrier Fb and generates a time error signal of the signal transmitted on the second carrier Fb.

A complex despreader 356 multiplies the time-adjusted second PN sequence received from the second PN sequence generator 351 by the signal transmitted on the third carrier Fc, for despreading. The complex despreader 356 generates a despread EARLY signal of the signal transmitted on the third carrier Fc by use of the early PN sequence received from the second PN sequence generator 351 and a despread LATE signal of the signal transmitted on the third carrier Fc by use of the LATE PN sequence. A time error detector 357 detects a time error rate from the despread EARLY and LATE signals of the signal transmitted on the third carrier Fc received from the complex despreader 356. Here, the time error detector 357 calculates (EARLY$^2$–LATE$^2$) of the signal transmitted on the third carrier Fc and generates a time error signal of the signal transmitted on the third carrier Fc.

TAU-DITHER can be used for the time error detectors 353, 355, and. 357. A time tracking combiner 358 combines the time error values of the signals transmitted on the carriers received from the time error detectors 353, 355, and 357. Here, the time tracking combiner 358 simply adds the time error values of the signals transmitted on the three carriers or adds them with weighting factors assigned to them. A time compensator 359 generates a control signal for controlling a first PN sequence generating time position of the first PN sequence generator 301 according to the time error value received from the time tracking combiner 358.

Then, detection of a frequency error in a multi-carrier will be described. A received signal strength indicator (RSSI) 371 detects the strength of the signal transmitted on the first carrier Fa by (Ion1$^2$+Qon1$^2$) of the first carrier signal Fa received from the pilot filter 315. A frequency difference detector (FDD) 372 detects a frequency difference signal of the signal transmitted on the first carrier Fa from the output of the pilot filter 315. The FDD 372 generates a frequency error signal FREQ_ERR A of the signal transmitted on the first carrier Fa by (Iprev1×Qon1–Ion1×Qprev1) of the signal transmitted on the first carrier Fa. Here, Iprev1 and Qprev1 are the previous Ion1 and Qon1 signals.

An RSSI 373 detects the strength of the signal transmitted on the second carrier Fb by (Ion2$^2$+Qon2$^2$) of the second carrier signal Fb received from the pilot filter 325. An FDD 374 detects a frequency error signal of the signal transmitted on the second carrier Fb from the output of the pilot filter 325. The FDD 374 generates a frequency error signal FREQ_ERR B of the signal transmitted on the second carrier Fb by (Iprev2×Qon2–Ion2×Qprev2) of the signal transmitted on the second carrier Fb. Here, Iprev2 and Qprev2 are the previous Ion2 and Qon2 signals.

An RSSI 375 detects the strength of the signal transmitted on the third carrier Fb by (Ion3$^2$+Qon3$^2$) of the third carrier signal Fc received from the pilot filter 335. An FDD 376 detects a frequency error signal of the signal transmitted on the third carrier Fc from the output of the pilot filter 335. The FDD 376 generates a frequency error signal FREQ_ERR C of the signal transmitted on the third carrier Fc by (Iprev3× Qon3–Ion3×Qprev3) of the signal transmitted on the third carrier Fc. Here, Iprev3 and Qprev3 are the previous Ion3 and Qon3 signals.

The CDMA rake receiver according to the first embodiment of the present invention synchronizes with an input signal in time, frequency, and phase. Here, if signals on different carriers are propagated in the same path, the carriers in different bands have the same or a similar frequency error. The first embodiment shown in FIG. 3 compensates for a time delay and a frequency error individually for the carriers. For example, assuming that a rake receiver in a mobile station tracks four paths and three channel frequency carriers are used for data transmission, a total of 12 data path receivers are needed.

The operation of generating phase-compensated signals by despreading signals received on the carriers will be described. For clarity, the description will be confined to the first carrier Fa. The complex despreader 311 multiplies the signal transmitted on the first carrier Fa by the PN sequence generated from the first PN sequence generator 301, for despreading. The multiplier 313 multiplies the PN-despread signal by the first orthogonal code Walsh_code A, for orthogonal demodulation. The orthogonally demodulated signal is accumulated by the symbol accumulator 314, phase-compensated by the phase compensator 316, and then fed to the multiplexer 302. The signals transmitted on the second and third carriers Fb and Fc are despread, demodulated, and then applied to the multiplexer 302 in the same manner.

Then, tracking a frequency error will be described. The FDD 372 receives the current I- and Q-channel signals Ion1 and Qon1 of the signal transmitted on the first carrier Fa from the pilot filter 315 and detects a frequency error of the signal transmitted on the first carrier Fa by subtracting the product of the current I channel signal Ion1 and the previous Q channel signal Iprev1 from the product of the previous I channel signal Ion1 and the current Q channel signal Qprev1. The FDDs 374 and 376 detect frequency errors of the signals transmitted on the second and third carriers Fb and Fc in the same manner.

The FDDs 372, 374, and 376 function as frequency trackers for tracking corresponding carrier frequencies (Iprev×Qon–Ion×Qprev) and thus generating frequency errors.

Thirdly, tracking and compensating for a time error will be described. The second PN sequence generator 351 sequentially generates the EARLY PN sequence and the LATE PN sequence for the input of the current PN sequence generated from the first PN sequence generator 301. Then, the complex despreader 352 generates a despread EARLY signal by multiplying the EARLY PN sequence by the signal transmitted on the first carrier Fa and then a despread LATE signal by multiplying the LATE PN sequence by the signal received on the first carrier Fa. Then, the time error detector 353 detects a time error value of the signal received on the first carrier Fa by calculating (EARLY$^2$–LATE$^2$). Time errors of the signals received on the second and third carriers Fb and Fc can be detected in the same manner.

Here, the complex despreaders 352, 354, and 356 and the time error detectors 353, 355, and 357 function as time trackers for tracking time delays of the signals received on the corresponding carriers (EARLY$^2$–LATE$^2$) and generating the time errors of the carriers.

The time error values of the carriers are combined by the time tracking combiner 358. The time compensator 359 generates a signal for compensating for an error of a time position at which to generate the PN sequence in the first PN sequence generator 301 according to the combined time error signal. Therefore, the first PN sequence generator 301 generates a PN sequence at an accurate time position based on the output of the time compensator 359.

The CDMA rake receiver according to the first embodiment of the present invention can use the first PN sequence generator for common use by combining the three carriers in their paths, as shown in FIG. 3. The three FDDs 372, 374, and 376 track frequencies separately for the carriers. To compensate for a time error in consideration of a frequency selection attenuation on a transmission channel, the time error detectors 353, 355, and 357 track time errors in the carriers, respectively and the time tracking combiner 358 combines the time errors using channel measurement information of the carriers to be used as a control signal for the first PN sequence generator 301 commonly used for the carriers. Although tracking one carrier may result in a bit error rate (BER) the same as that in TIA IS-95A, the frequency selection path attenuation is overcome by tracking a time error for each carrier to support the future mobile communication system requiring more reliable communications such as a high rate data transmission.

The CDMA rake receiver of FIG. 3 uses one frequency tracker for each of the plurality of propagation paths. The first PN sequence generator 301 is used commonly for the carriers on the assumption that the time errors of the carriers are the same in each path.

The frequency tracker can detect frequency errors from all propagation paths of the carriers almost accurately simply by tracking one of the carriers since the carriers are separated by the same distance using the digital mixer 210 at a transmitter and a receiver. The time errors detected by the time trackers are combined to be used as a control signal for the first PN sequence generator 301 commonly used for each propagation path. The FDDs 372, 374, and 376 detect a frequency error from each carrier and compensates for the frequency error of a received signal in the frequency tracking loop using the detected frequency errors.

Referring to FIG. 4, the structure of a CDMA rake receiver according to a second embodiment of the present invention will be described. The CDMA rake receiver of FIG. 4 compensates for phase and time errors of received signals separately for carriers and compensates for frequency errors thereof commonly for the carriers. Here, frequency error compensation is described in the context of the signal transmitted on the first carrier Fa. Frequency errors of the signals received on the second and third carriers Fb and Fc can be compensated for in the same manner.

Referring to FIG. 4, the CDMA rake receiver according to the second embodiment is the same as that shown in FIG. 3 except for the structures of FDDs and RSSIs. The CDMA rake receiver according to the second embodiment uses one frequency tracker for each of a plurality of propagation paths. An FDD 372 is used for the signal received on the first carrier Fa in the second embodiment. On the assumption that time errors of carriers are the same in each propagation path, the first PN sequence generator 301 is commonly used for the carriers.

The FDD 372 can detect frequency errors from all propagation paths of the carriers almost accurately simply by tracking one of the carriers since the carriers are separated by the same distance using the digital mixer 210 at a transmitter and a receiver. The time errors detected by time trackers are combined to be used as a control signal for the first PN sequence generator 301 commonly used for each propagation path. The FDD 372 detects a frequency error from the strongest carrier and compensates for the frequency error of a received signal in a frequency tracking loop using the detected frequency error.

Referring to FIG. 5, the structure of a CDMA rake receiver according to a third embodiment of the present invention will be described. The CDMA rake receiver of FIG. 5 compensates for phase errors of received signals separately for carriers and compensates for time and frequency errors thereof commonly for the carriers. Here, frequency error compensation is described in the context of the signal transmitted on the first carrier Fa. Frequency errors of the signals received on the second and third carriers Fb and Fc can be compensated for in the same manner.

For time delay compensation in the third embodiment, the second PN sequence generator 351 sequentially generates the EARLY PN sequence and the LATE PN sequence for the input of the current PN sequence generated from the first PN sequence generator 301. Then, a complex despreader 356 generates a despread EARLY signal by multiplying the EARLY PN sequence by the signal transmitted on the third carrier Fc and then a despread LATE signal by multiplying the LATE PN sequence by the signal received on the first carrier Fa. Then, a time error detector 357 detects a time error value of the signal received on the third carrier Fc by calculating (EARLY$^2$–LATE$^2$). The output of the time error detector 357 is applied to the time compensator 359. The time compensator 359 generates a control signal for compensating for an error of a time position at which to generate the PN sequence in the first PN sequence generator 301 according to the time error signal. Therefore, the first PN sequence generator 301 generates a PN sequence at an accurate time position based on the output of the time compensator 359.

While time error compensation has been described in the context of the signal transmitted on the third carrier Fc, time errors of the signals received on the first and second carriers Fa and Fb can be compensated for in the same manner.

Referring to FIG. 5, the CDMA rake receiver according to the third embodiment is the same as that shown in FIG. 3, except for the structures of FDDs, RSSIs, and time compensation devices. The CDMA rake receiver according to the third embodiment uses one frequency tracker for each of a plurality of propagation paths. The FDD 372 is used for the signal received on the first carrier Fa in the third embodiment and the first PN sequence generator 301 is used commonly for the carriers using a time error of the signal transmitted on the third carrier Fc.

The FDD 372 can detect frequency errors from all propagation paths of the carriers almost accurately simply by tracking one of the carriers since the carriers are separated by the same distance using the digital mixer 210 at a transmitter and a receiver. The time errors detected by time trackers are combined to be used as a control signal for the first PN sequence generator 301 commonly used for each propagation path. The FDD 372 detects a frequency error from the strongest carrier and compensates for the frequency error of a received signal in a frequency tracking loop using the detected frequency error.

The CDMA rake receiver according to the third embodiment uses one time tracker and one frequency tracker for each propagation path. Since the time errors of a plurality of carriers are the same in each propagation path, they can be compensated for simply by tracking one of the carriers. The frequency tracker can detect frequency errors in propagation paths of all the carriers without any serious errors just by tracking one carrier since the carriers are separated in the same intervals by a digital mixer at a transmitter and a receiver. The time error detected by the time tracker among the carriers is used as a time delay control value for the common PN sequence generator and for compensating for a frequency error received in a frequency tracking loop.

Here, when time delay errors and/or frequency errors are commonly compensated for, it is preferable that time delay information and/or frequency error information is detected from a carrier with the strongest signal and used for correcting the errors of each carrier signal.

As described above, a multi-carrier CDMA rake receiver according to the present invention can compensate for a phase error separately for each carrier and a frequency error and time delay commonly for all carriers during time-, frequency-, and phase-synchronization to a received signal. Therefore, a BER can be decreased even in a bad channel environment, resulting in the increase of the capacity of the whole system.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A receiving device in a multi-carrier CDMA communication system, comprising:
   a first PN sequence generator for generating a first PN sequence for PN-despreading signals received on multi-carriers;
   a second PN sequence generator for generating second PN sequences by advancing and delaying the first PN sequence by a predetermined time period;
   a time tracker for despreading a signal received on one carrier among the signals received on multi-carriers by the second PN sequences and detecting a time error using an early and a late despread signals; and
   a time compensator for generating a control signal to compensate for a time error of the first PN sequence by the detected time error.

2. The receiving device of claim 1, wherein the time tracker comprises:
   a PN despreader for generating early and late despread signals by sequentially multiplying the signal received on the carrier by the second PN sequences; and
   a time error detector for detecting the time error by subtracting a square signal of the late despread signal from a square signal of the early despread signal.

3. A receiving device in a multi-carrier CDMA communication system, comprising:
   a PN sequence generator for generating a PN sequence for PN-despreading carriers received on multi-carriers;
   a PN despreader for despreading a signal received on one carrier among the signals received on the multi-carriers by the PN sequence;
   a pilot filter for detecting a pilot signal from the PN-despread signal;
   a frequency tracker for detecting a frequency error by subtracting the product of the current I-channel pilot signal and a previous Q-channel pilot signal from the product of a previous I-channel pilot signal and a current Q-channel pilot signal of the detected pilot signal; and
   a frequency compensator for compensating for frequency errors of the signals received on the multi-carriers by the detected frequency error.

4. A receiving device in a multi-carrier CDMA communication system, comprising:
   a first PN sequence generator for generating a first PN sequence to PN-despread signals received on multi-carriers;
   a despreader for despreading the signals received on the multi-carriers by the first PN sequence;
   a pilot filter for detecting a pilot signal from at least one of the despread signals;
   a frequency tracker for detecting a frequency error by subtracting the product of a current I-channel pilot signal and a previous Q-channel pilot signal from the product of a previous I-channel pilot signal and a current Q-channel pilot signal of the detected pilot signal;
   a frequency compensator for compensating for frequency errors of the signals received on the multi-carriers by the detected frequency error;
   a second PN sequence generator for generating second PN sequences by advancing and delaying the first PN sequence by a predetermined time period;
   a time tracker for despreading at least one signal received on one carrier among the signals received on multi-carriers by the second PN sequences and detecting time errors using the two despread signals; and
   a time compensator for feeding to the first PN sequence generator a control signal to adjust a time position at which to generate the first PN sequence.

5. The receiving device of claim 4, wherein the time tracker comprises:
   a PN despreader for generating early and late despread signals by sequentially multiplying the at least one signal received on the carrier by the second PN sequences; and
   a time error detector for detecting a time delay value by the power difference between the early and late despread signals.

6. A receiving device in a multi-carrier CDMA communication system, comprising:
   time compensation means having a time tracker for each of signals received on multi-carriers, for generating a time delay compensation signal by combining time errors of the carriers received from the time trackers;
   a first PN sequence generator for generating a first PN sequence whose time delay is compensated for by the time delay compensation signal;
   a plurality of PN despreaders for PN-despreading the signals received on the multi-carriers by the first PN sequence;
   frequency compensation means for detecting pilot signals corresponding to the PN-despread signals, generating frequency error signals for the carriers by the detected pilot signals, and compensating for frequency errors of the signals received on the multi-carriers;

phase compensation means for compensating for phases of the carriers using the PN-despread signals and the pilot signals; and a multiplexer for multiplexing the phase-compensated signals.

7. The receiving device of claim 6, wherein the time compensation means comprises:

a second PN sequence generator for generating second PN sequences by advancing and delaying the first PN sequence by a predetermined time period;

a plurality of PN despreaders for generating early and late despread signals by sequentially multiplying the signals received on the multi-carriers by the second PN sequences;

a plurality of time error detectors provided corresponding to the PN despreaders, for detecting time errors by the power differences between the early and late despread signals;

a time tracking combiner for combining the time errors received from the time error detectors; and a time compensator for feeding a control signal to the first PN sequence generator to adjust a time position at which to generate the first PN sequence based on the combined time error.

8. The receiving device of claim 6, wherein the frequency compensation means comprises:

a plurality of pilot filters for detecting the pilot signals from the corresponding PN-despread signals;

a plurality of frequency trackers for detecting frequency errors by subtracting the products of a current I-channel pilot signal and a previous Q-channel pilot signal from the products of a previous I-channel pilot signal and a current Q-channel pilot signal of the detected pilot signals;

a frequency compensator for compensating for frequency errors of the signals received on the multi-carriers by the detected frequency errors.

9. The receiving device of claim 6, wherein, the phase compensation means comprises:

a plurality of pilot filters for detecting the pilot signals from the corresponding PN-despread signals;

a plurality of multipliers for multiplying the PN-despread signals by corresponding unique orthogonal codes, for orthogonal demodulation;

a plurality of symbol accumulators for accumulating the outputs of the multipliers in symbol units; and a plurality of phase compensators for compensating for phases of the outputs of the symbol accumulators using the corresponding pilot signals received from the pilot filters.

10. A receiving device in a multi-carrier CDMA communication system, comprising:

time compensation means having a time tracker for at least one signal received on multiple carriers, for generating a time delay compensation signal corresponding to a time error received from the time tracker;

a first PN sequence generator for generating a first PN sequence whose time delay is compensated for by the time delay compensation signal;

a plurality of PN despreaders for PN-despreading signals received on multi-carriers by the first PN sequence;

frequency compensation means for detecting pilot signals corresponding to the PN-despread signals, generating a frequency error signal for the carriers by at least one of the detected pilot signals, and compensating for frequency errors of the signals received on the multi-carriers;

phase compensation means for compensating for phases of the carriers using the PN-despread signals and the pilot signals; and a multiplexer for multiplexing the phase-compensated signals.

11. The receiving device of claim 10, wherein the time compensation means comprises:

a second PN sequence generator for generating second PN sequences by advancing and delaying the first PN sequence by a predetermined time period;

a PN despreader for generating early and late despread signals by sequentially multiplying at least one signal received on a carrier by the second PN sequences;

a time error detector for detecting time errors by the power difference between the early and late despread signals; and a time compensator for feeding a control signal to adjust a time position at which to generate the first PN sequence based on the combined time error to the first PN sequence generator.

12. The receiving device of claim 10, wherein the frequency compensation means comprises:

a plurality of pilot filters for detecting the pilot signals from the corresponding PN-despread signals;

a frequency tracker for detecting a frequency error by subtracting the product of a current I-channel pilot signal and a previous Q-channel pilot signal from the product of a previous I-channel pilot signal and a current Q-channel pilot signal of one of the detected pilot signals; and a frequency compensator for compensating for frequency errors of the signals received on the multi-carriers by the detected frequency error.

13. The receiving device of claim 10, wherein the phase compensation means comprises:

a plurality of pilot filters for detecting the pilot signals from the corresponding PN-despread signals;

a plurality of multipliers for multiplying the PN-despread signals by corresponding unique orthogonal codes, for orthogonal demodulation;

a plurality of symbol accumulators for accumulating the outputs of the multipliers in symbol units; and a plurality of phase compensators for compensating for phases of the outputs of the symbol accumulators using the corresponding pilot signals received from the pilot filters.

14. A receiving method in a multi-carrier CDMA communication system, comprising the steps of:

detecting a time error corresponding to at least one signal received on one carrier among signals received on multi-carriers and generating a time delay compensation signal corresponding to the detected time error;

generating a first PN sequence whose time delay is compensated by the time delay compensation signal;

PN-despreading the signals received on the multi-carriers by the first PN sequence;

detecting a pilot signal corresponding to each of the PN-despread signals, generating a frequency error signal by at least one of the detected pilot signals, and compensating for frequency errors of the signals received on the multi-carriers;

compensating for phases for the respective carriers using the PN-despread signals and the pilot signals; and multiplexing the phase-compensated signals.

15. The receiving method of claim 14, wherein the time delay compensation signal generating step comprises the steps of:

generating second PN sequences by advancing and delaying the first PN sequence by a predetermined time period;

generating early and late despread signals by sequentially multiplying at least one signal received on a carrier by the second PN sequences;

detecting a time error by the power difference between the early and late despread signals; and generating a control signal to adjust a time position at which to generate the first PN sequence based on the combined time error.

16. The receiving method of claim 14, wherein the frequency error compensating step comprises the steps of:

detecting the pilot signals from the corresponding PN-despread signals;

detecting a frequency error by subtracting the product of a current I-channel pilot signal and a previous Q-channel pilot signal from the product of a previous I-channel pilot signal and a current Q-channel pilot signal of at least one of the detected pilot signals; and compensating for frequency errors of the signals received on the multi-carriers by the detected frequency error.

17. The receiving method of claim 14, wherein the phase compensating step comprises the steps of:

multiplying the PN-despread signals by corresponding unique orthogonal codes, for orthogonal demodulation;

accumulating the orthogonally demodulated signals in symbol units; and compensating for phases of the signals received on the multi-carriers using the corresponding pilot signals.

18. A receiving device in a multi-carrier CDMA communication system, comprising:

time compensation means having a time tracker for each of signals received on multi-carriers, for generating a time delay compensation signal by combining time errors of the carriers received from the time trackers;

a first PN sequence generator for generating a first PN sequence whose time delay is compensated for by the time delay compensation signal;

a plurality of PN despreaders for PN-despreading the signals received on the multi-carriers by the first PN sequence;

frequency compensation means for detecting pilot signals corresponding to the PN-despread signals, generating a frequency error signal for the carriers by at least one of the detected pilot signals, and compensating for frequency errors of the signals received on the multi-carriers;

phase compensation means for compensating for phases of the carriers using the PN-despread signals and the pilot signals; and a multiplexer for multiplexing the phase-compensated signals.

19. The receiving device of claim 18, wherein the time compensation means comprises:

a second PN sequence generator for generating second PN sequences by advancing and delaying the first PN sequence by a predetermined time period;

a plurality of PN despreaders for generating early and late despread signals by sequentially multiplying the signals received on the multi-carriers by the second PN sequences;

a plurality of time error detectors provided corresponding to the PN despreaders, for detecting time errors by the power differences between the early and late despread signals;

a time tracking combiner for combining the time errors received from the time error detectors; and a time compensator for feeding a control signal to the first PN sequence generator to adjust a time position at which to generate the first PN sequence based on the combined time error.

20. The receiving device of claim 18, wherein the frequency compensation means comprises:

a plurality of pilot filters for detecting the pilot signals from the corresponding PN-despread signals;

a frequency tracker for detecting a frequency error by subtracting the product of a current I-channel pilot signal and a previous Q-channel pilot signal from the product of a previous I-channel pilot signal and a current Q-channel pilot signal of one of the detected pilot signals; and a frequency compensator for compensating for frequency errors of the signals received on the multi-carriers by the detected frequency error.

21. The receiving device of claim 18, wherein the phase compensation means comprises:

a plurality of pilot filters for detecting the pilot signals from the corresponding PN-despread signals;

a plurality of multipliers for multiplying the PN-despread signals by corresponding unique orthogonal codes, for orthogonal demodulation;

a plurality of symbol accumulators for accumulating the outputs of the multipliers in symbolic units; and a plurality of phase compensators for compensating for phases of the outputs of the symbol accumulators using the corresponding pilot signals received from the pilot filters.

* * * * *